United States Patent
Vivian

[15] 3,663,255
[45] May 16, 1972

[54] COMPOSITION CONTAINING CHLORINATED HYDROCARBONS KETONES AND GLYCOL ETHERS, FOR REFLOWING ORGANIC SURFACES

[72] Inventor: Thomas A. Vivian, Midland, Mich.
[73] Assignee: The Dow Chemical Company, Midland, Mich.
[22] Filed: Dec. 1, 1969
[21] Appl. No.: 881,284

Related U.S. Application Data

[63] Continuation-in-part of Ser. No. 844,662, July 24, 1969, abandoned.

[52] U.S. Cl..............................106/285, 106/311, 264/341
[51] Int. Cl. ..........................................................C08h 7/22
[58] Field of Search...............252/171; 134/38, 40; 106/311, 106/187–189, 285

[56] References Cited

UNITED STATES PATENTS

| | | | |
|---|---|---|---|
| 1,557,520 | 10/1925 | Ellis | 252/171 |
| 2,969,328 | 1/1961 | Ellenson | 252/171 |
| 2,999,816 | 9/1961 | Bennett | 252/171 |
| 3,379,549 | 4/1968 | Playfair | 106/311 |
| 3,020,661 | 2/1962 | Miller et al. | 264/341 |

FOREIGN PATENTS OR APPLICATIONS

| | | | |
|---|---|---|---|
| 773,632 | 5/1957 | Great Britain | 252/171 |
| 302,390 | 12/1928 | Great Britain | 106/190 |

OTHER PUBLICATIONS

Defensive Publication — The O.G. Defensive Publication Holt, Def. Pub. of Ser. No. 867,969 filed Oct. 20, 1969 continuation of Ser. No. 684,537 filed Nov. 20, 1967, published in 872 O.G. 1411 on Mar. 31, 1970 Defensive Pub. No. T 872,012

*Primary Examiner*—Theodore Morris
*Attorney*—Griswold & Burdick, Herbert D. Knudsen and C. E. Rehberg

[57] ABSTRACT

Compositions for reflowing organic surfaces, such as paints and polystyrene, have been discovered which contain by volume 50 to 90 percent of a liquid chlorinated aliphatic hydrocarbon, 5 to 30 percent of a liquid ketone or alcohol, 2 to 20 percent of glycol ether alkanoate and 0 to 30 percent of an alkyl alkanoate, all of such components having a boiling point below 200° C.

12 Claims, No Drawings

COMPOSITION CONTAINING CHLORINATED HYDROCARBONS KETONES AND GLYCOL ETHERS, FOR REFLOWING ORGANIC SURFACES

CROSS-REFERENCE TO RELATED APPLICATIONS

The present application is a continuation-in-part of my prior application Ser. No. 844,662 filed July 24, 1969 now abandoned.

BACKGROUND OF THE INVENTION

Although various solvents have been used to reflow thermoplastic organic surfaces, heat treatment has been the primary technique used to reflow such surfaces. Of the solvents, chlorinated hydrocarbons are especially effective reflow agents. The greatest drawback to the commercial use of chlorinated solvents on pigmented organic materials, however, has been the marked discoloration encountered when these solvents are employed. This discoloration is especially troublesome when methylene chloride is used to reflow metallized paints. Also, in reflowing thermoplastic surfaces, crazing and bloom-back are encountered in addition to discoloration.

SUMMARY OF THE INVENTION

According to the present invention, reflow compositions containing by volume 50 to 90 percent of a liquid chlorinated aliphatic hydrocarbon, 5 to 30 percent of a ketone or alcohol, 2 to 20 percent of a glycol ether alkanoate and 0 to 30 percent of an alkyl alkanoate, all of such components having a boiling point below 200° C., have been found to be especially effective reflow agents for thermoplastic organic surfaces such as paint.

Organic surfaces are easily reflowed by the compositions of the present invention by applying the composition to the surface in the form of a liquid by means of a fine spray, or preferably by vaporizing the composition and contacting the surface with a vapor at an elevated temperature. During reflow, the organic surface becomes fluid and is mobilized to form an essentially uniform coat over the supporting body. After reflow, the organic surface dries as the solvent is evaporated under its own vapor pressure at ambient conditions or by heating the reflowed surface. The dried surface forms an essentially identical surface to that of the surrounding area. Thus, by localized reflow, minor imperfections in a small area of an organic surface may be removed without creating noticeable distortions in the color or other characteristics of the total surface. Alternatively, the whole surface may be reflowed to improve gloss in lieu of buffing.

The chlorinated aliphatic hydrocarbon of the composition of the invention may suitably be any normally liquid chlorinated hydrocarbon that is a partial solvent for the organic surface. These chlorinated hydrocarbons suitably have one to six or more carbon atoms and a boiling point of less than 200° C. at atmospheric pressure. Although the hydrocarbon backbone may vary widely, best results have been obtained with two to six or more chlorine atoms per molecule. According to these general limitations, representative compounds of the present invention include: the chlorinated alkanes such as methylene chloride, chloroform, 1,1- and 1,2-dichloroethane, 1,1,1- and 1,1,2-trichloroethane, the various trichloropropanes, tetrachloropropanes, tetrachlorobutanes, hexachlorobutanes, dichloropentanes and trichlorohexanes; and the chlorinated alkenes such as 1,2- cis- and trans-dichloroethylene, trichloroethylene, tetrachloroethylene, the trichloropropenes, tetrachlorobutenes. In the preferred composition of the present invention, the chlorinated aliphatic component is a chlorinated alkane or alkene of one to three carbon atoms with methylene chloride, 1,2- cis- or trans-dichloroethylene, trichloroethylene and tetrachloroethylene being of special interest. Of greatest importance in the present invention is methylene chloride.

Although the chlorinated aliphatic hydrocarbon may comprise 50 to 90 percent by volume of the composition of the present invention, compositions containing 60 to 80 percent of the chlorinated hydrocarbon are preferred. The chlorinated hydrocarbon may also be stabilized against metal reduction with minor amounts of various stabilizers such as propylene oxide, butylene oxide, dimethoxymethane or other suitable stabilizers. The use of such stabilizers is preferred when methylene chloride is the chlorinated aliphatic hydrocarbon.

The second component of the reflow composition of the present invention is a ketone or alcohol which may comprise 5 to 30 percent by weight of the reflow composition. Such ketones and alcohols are normally liquid at room temperature and have a boiling point of about 50° to about 200° C. at atmospheric pressure. Dialkyl ketones and alkanols are preferred in the present invention. Representative examples of such ketones and alcohols include: ketones having up to about 11 carbon atoms, such as acetone, methyl ethyl ketone, diethyl ketone, methyl propyl ketone, methyl isobutyl ketone, ethyl amyl ketone, di-n-butyl ketone, allyl ethyl ketone, acetyl acetone and methyl hexyl ketone; and alcohols containing up to about eight carbon atoms such as methanol, ethanol, propanol, isopropanol, n-butanol, 2-butanol, pentanol, hexanol, octanol and allyl alcohol. Of these ketones and alcohols, acetone, methyl ethyl ketone, methyl isobutyl ketone and butanol are preferred. Although the concentration of the ketone and alcohol may range from about 5 to about 30 volume percent, concentrations of about 10 to about 25 volume percent are preferred.

The third component of the present invention is a glycol ether alkanoate. Such glycol ether esters have one of the terminal hydroxyls capped with an alkyl ether group and the other hydroxyl capped with an acyl group and may be prepared by reacting a glycol according to ordinary etherification and esterification reactions. Preferred glycol ether esters boil at about 140° to about 200° C. Representative examples of suitable glycol ether esters include: ethylene glycol ether esters, such as ethylene glycol ethyl ether acetate, ethylene glycol butyl ether acetate, ethylene glycol methyl ether acetate, ethylene glycol methyl ether propionate, ethylene glycol propyl ether acetate, and ethylene glycol methyl ether butyrate; propylene glycol ether esters, such as propylene glycol ethyl ether acetate, propylene glycol methyl ether acetate, propylene glycol propyl ether acetate, propylene glycol methyl ether propionate, propylene glycol methyl ether butyrate and propylene glycol butyl ether acetate; and butylene glycol ether esters such as butylene glycol ethyl ether acetate, butylene glycol methyl ether acetate, butylene glycol ethyl ether butyrate and butylene glycol butyl ether acetate. Preferred lower alkylene glycol ether esters have an alkyl ether group of one to four carbon atoms and an acyl group of two to five carbon atoms. Also preferred in the present invention are the glycol ether esters of ethylene glycol. Especially preferred in the present invention is the use of ethylene glycol ethyl ether acetate. Although the glycol ether acetate may be present in amounts of about 2 to about 20 percent by volume, compositions containing about 5 to about 15 percent by volume of the glycol ether ester are preferred.

The fourth and optional component of the present invention is an alkyl alkanoate. Suitable esters of the present invention have a boiling point of about 50° to about 200° C. and contain about three to about 10 or more carbon atoms. Representative examples of such esters include methyl acetate, ethyl acetate, butyl acetate, hexyl acetate, ethyl propionate, ethyl butanoate, propyl hexanoate and butyl propionate. The use of butyl acetate as the ester is preferred especially when organic surfaces having a temperature of about 30° C. are reflowed. As the temperature of the organic surface is increased, the alkyl ester of the composition is preferably replaced by the glycol ether ester which is more effective for high temperature applications.

The compositions of the present invention are simply prepared by mixing the individual components in the proportions described above. The reflowing compositions of the present invention may suitably be applied to any organic surface that is at least partially soluble in the reflow composition to remove minor imperfections from localized areas or from the entire surface. The particular reflow composition may vary widely as different organic surfaces and terminal characteristics are desired. Of the various organic surfaces that may be reflowed by the compositions of the present invention, paints including lacquers and enamels, thermoplastic resins, such as polystyrene, polybutadiene, acrylonitrile-butadiene-styrene and similar substances, are preferred, with the reflow of paint being of particular interest.

With the compositions of the present invention, minor imperfections are conveniently and effectively removed from a thermoplastic organic surface by applying a reflow composition of the invention to the surface under conditions which allow for rapid vaporization of the reflow solvent. Generally, the reflow compositions of the invention are volatile enough to be removed under normal room conditions, but some may require heating or other technique to increase the rate of evaporation.

SPECIFIC EMBODIMENTS

EXAMPLES 1-4

Four pieces of steel measuring 12 × 6 inches were completely painted on one side with aluminized acrylic lacquer and dried. With a coarse piece of sandpaper, a 3 inch wide scratched area was made in the paint along one side. Masking tape was then applied to partially cover the scratched and unscratched painted area. Various compositions of the invention were then vaporized and hot vapors were contacted with the individual test sections to reflow the exposed paint. The test sections were allowed to dry, the mask was removed and the appearance of the reflowed areas was examined in comparison to the part of the metal sheet covered by the masking tape during the solvent reflow operation. The discoloration, characteristics of the reflowed surface and subsequent blistering under high humidity conditions were tested. The blistering experiments were conducted by placing the reflowed metal plate in a chamber at 100 percent relative humidity and 95°-140° F. for a period of 4 days shortly after the painted surface had been reflowed and then observing the surface for blistering. The examples were run under room temperature conditions, about 75° F., and also under high temperature conditions, about 140° F. In each example, the paint was reflowed, minor scratches in the surface were removed, a glossy surface resulted and no blistering was encountered. The compositions and results of the discoloration observations are shown in Table I.

Also in the same manner, other compositions containing by volume 50 to 90 percent of a liquid aliphatic chlorinated hydrocarbon, 5 to 30 percent of a ketone or alcohol, 2 to 20 percent of a glycol ether ester and 0 to 30 percent of an alkyl ester may be employed as a solvent in the vapor reflow of the organic surfaces above. Representative examples of such compositions include compositions containing 5 percent n-butanol, 30 percent propyl acetate, 5 percent ethylene glycol methyl ether acetate and 60 percent trichloroethylene; 30 percent dipropyl ketone, 20 percent propylene glycol propyl ether acetate and 50 percent perchloroethylene; and 10 percent hexanol, 10 percent butylene glycol ethyl ether propionate and 80 percent methylene chloride.

I claim:

1. A composition of matter, consisting essentially of, by volume,
   50–90 percent of a liquid chlorinated aliphatic hydrocarbon selected from the group consisting of chlorinated alkanes and alkenes having one-three carbon atoms and mixtures thereof,
   5–30 percent of a dialkyl ketone of up to 11 carbons,
   2–20 percent of a lower alkylene glycol ether alkanoate having an alkyl ether moiety of one-four carbons and an acyl moiety of two-five carbons,
   0–30 percent of an alkyl alkanoate, all of such components having a boiling point below 200° C.

2. The composition of claim 1 wherein the chlorinated hydrocarbon is methylene chloride, 1,2-cis- and trans-dichloroethylene, trichloroethylene, tetrachloroethylene or mixtures thereof.

3. The composition of claim 1 wherein 60 to 80 percent by volume of the composition is the chlorinated aliphatic hydrocarbon.

4. The composition of claim 1 wherein the ketone is acetone, methyl ethyl ketone or methyl isobutyl ketone.

5. The composition of claim 1 wherein 10 to 25 percent by volume is the ketone.

6. The composition of claim 1 wherein the lower alkylene glycol ether alkanoate is an ethylene glycol ether alkanoate.

7. The composition of claim 1 wherein 5 to 15 percent by volume is the lower alkylene glycol ether alkanoate.

8. The composition of claim 1 containing ethylene glycol ethyl ether acetate.

9. The composition of claim 1 wherein the chlorinated hydrocarbon is methylene chloride.

10. The composition of claim 9 wherein the ketone is acetone.

11. The composition of claim 9 wherein the ketone is methyl ethyl ketone.

TABLE I.—REFLOW OF ALUMINIZED ACRYLIC LACQUER

| Composition, wt. percent | Discoloration | |
| --- | --- | --- |
| | 70° F. | 140° F. |
| Example: | | |
| 1. 70% methylene chloride,[1] 20% methyl ethyl ketone, 10% ethylene glycol ethyl ether acetate. | Faint dull haze, very little discoloration. | No haze, no discoloration. |
| 2. 70% methylene chloride,[1] 20% acetone, 10% ethylene glycol ethyl ether acetate. | Very faint haze, very little discoloration. | No haze, very faint discoloration. |
| 3. 70% methylene chloride,[1] 20% methyl ethyl ketone, 5% ethylene glycol ethyl ether acetate, 5% butyl acetate. | Faint haze, very little discoloration. | Very faint haze, very little discoloration. |
| 4. 70% methylene chloride,[1] 20% acetone, 5% ethylene glycol ethyl ether acetate, 5% butyl acetate. | Faint haze, little discoloration. | Faint haze, little discoloration. |

[1] Containing 0.5% by weight propylene oxide.

Also in the same manner as described by the examples above, compositions containing 50 to 90 percent by weight of methylene chloride, 5 to 30 percent by weight methyl ethyl ketone or acetone, 2 to 20 percent by weight of ethylene glycol ethyl ether acetate may be employed to vapor reflow thermoplastic acrylic lacquer paints and thermoplastic polymers, such as polystyrene and polybutadiene.

12. The composition of claim 1 wherein the chlorinated hydrocarbon is methylene chloride, 1,2-cis- or trans-dichloroethylene, trichloroethylene, tetrachloroethylene, or mixture thereof, the ketone is acetone, methyl ethyl ketone, methyl isobutyl ketone or mixture thereof and the lower alkylene glycol ether alkanoate is ethylene glycol ethyl ether acetate.

* * * * *